United States Patent [19]

Featherstone

[11] 3,970,149

[45] July 20, 1976

[54] HORSESHOE

[76] Inventor: Sammie W. Featherstone, 2232 Maplecrest Drive, Donelson, Tenn. 37214

[22] Filed: Feb. 13, 1975

[21] Appl. No.: 549,464

[52] U.S. Cl. ................................. 168/25
[51] Int. Cl.² ........................... A01L 1/00
[58] Field of Search ................. 168/23, 25, 11, 18, 168/19, 31, 35, DIG. 1, 20

[56] References Cited
UNITED STATES PATENTS

| 380,800 | 4/1888 | Howell | 168/11 |
|---|---|---|---|
| 1,147,927 | 7/1915 | Chovanecz | 168/20 |
| 1,236,203 | 8/1917 | Murray | 168/11 |
| 2,529,419 | 11/1950 | Quartullo | 168/25 |
| 3,023,812 | 3/1962 | Swartz | 168/23 |
| 3,747,683 | 7/1973 | Smith | 168/25 |

Primary Examiner—Jack Q. Lever
Attorney, Agent, or Firm—Harrington A. Lackey

[57] ABSTRACT

A horseshoe including an upper shoe member for attachment to a horse's hoof and having a latch recess, an intermediate body member having a latch tongue for engagement with the latch recess to secure the intermediate body member to the upper shoe member, and a lower shoe member adapted to be secured to the bottom surface of the body member. In a preferred form of the invention, the body member includes at least two cavities with separate inlets thereto for receiving fluent weight material.

4 Claims, 5 Drawing Figures

HORSESHOE

BACKGROUND OF THE INVENTION

This invention relates to horseshoes, and more particularly to a weighted horseshoe.

Horseshoes including an assembly of shoe elements for extending the length of the horse's hoof in order to improve the appearance of the horse's gait are known in the art as depicted in the U.S. Swartz Pat. No. 3,023,812.

Horseshoes including means for adding weight increments to the shoe are also known in the art as illustrated in the U.S. Barton Pat. No. 470,815 and the U.S. Wagener Pat. No. 1,938,471.

However, the means for fastening and detaching the various elements of an extended or weighted horseshoe assembly are time-consuming and usually limited to threaded bolts and mating threaded apertures.

SUMMARY OF THE INVENTION

It is therefore an object of this invention to provide a weighted horseshoe assembly in which the weights in the body portion of the horseshoe may be easily and quickly varied by virtue of an improved latching mechanism.

More specifically, the horseshoe made in accordance with this invention includes an upper shoe member, an intermediate body member having cavities for receiving fluent weight material, and a lower shoe member. The upper shoe member is adapted to be fastened directly to the bottom of the horse's hoof by conventional horseshoe nails, while the lower shoe member is semi-permanently attached to the bottom surface of the weighted body member, such as by threaded bolts. However, the weighted body member is adapted to be quickly and detachably latched to the bottom of the upper shoe member by a snugly fitting tongue and recess connection, and by a minimum number of threaded bolts.

Inlet ports are formed in the top of the body member to communicate with each of the cavities, and each inlet port is provided with a closure member. Thus, when a body member is separated from an upper shoe member, fluent weight material, such as mercury or metal shot, may be inserted into any one or more of the cavities by removing the respective closures and depositing the weight material into each cavity. The amount of weight material in each cavity may be carefully controlled to provide the proper weight distribution throughout the length of the horseshoe.

DESCRIPTION OF THE PREFERRED EMBODIMENT

Figure 3:
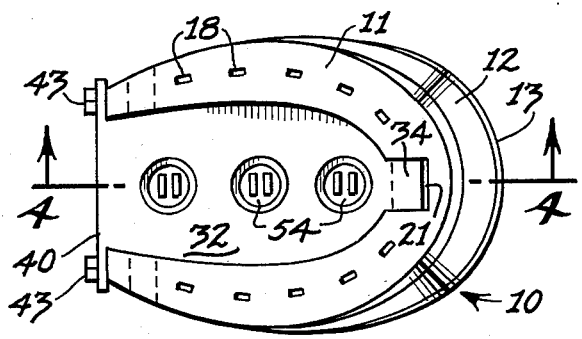
FIG. 3 is a top plan view of the horseshoe assembly removed from the hoof.

Referring now to the drawings in more detail, the horseshoe or horseshoe assembly 10 made in accordance with this invention includes an upper shoe member 11, an intermediate weighted body member 12 and a lower shoe member 13.

The upper shoe member 11 is C-shaped in the general configuration of a conventional horseshoe having a flat top surface 15 adapted to fit flush against the bottom surface of the horse's hoof 16, and having a flat bottom surface 17. Extending through the shoe member 11 at spaced intervals are a plurality of nail holes 18 through which horseshoe nails 19 are driven upward into the hoof 16 in a manner similar to horseshoe nails in a conventional horseshoe.

Formed in the front or toe portion of the shoe member 11 is a rearwardly opening recess 20 having a beveled bottom surface 21 declining rearward to intersect the flat bottom surface 17 of the upper shoe member 11. The latch recess 20 opens into a large central opening 22 formed by the C-shaped portion of the shoe member 11.

The rear end portion of the upper shoe member 11 is provided with depending calk members 24 and 25 having front surfaces 25 inclined forward. Threaded bolt holes or apertures 27 extend from front to rear entirely through the calk members 24 and 25.

The body member 12 has a substantially greater height or thickness than the upper shoe member 11, and is generally shaped as an extension of the hoof 16. The body member 12 is provided with a flat top surface 30 and a flat bottom surface 31.

A boss 32 having the general configuration and adapted to be snugly received within the central opening 22 of the upper shoe member 11 projects upward from the top surface 30 of the body member 12. Projecting forward from the front portion of the boss 32 is a tongue 34 having substantially the same shape as the recess 20 for latching reception by the latch recess 20. The bottom surface 35 of the tongue 34 inclines forward so that it mates flush with the inclined bottom surface 21 of the latch recess 20 in assembled position.

Calk recesses 37 and 38 are formed at the rear portion of the body member 12 as depressions in the top surface 30. The calk recesses 37 and 38 have complementary surfaces for snugly receiving the respective depending calk members 24 and 25 of the upper shoe member 11. The front surfaces 39 of the calk recesses 37 and 38 are inclined forward at substantially the same angle as the front surfaces 26 of the calk members 24 and 25.

The boss 32 projects rearwardly past the calk recesses 37 and 38 and terminates in a transverse T-bar 40 having threaded apertures 41 adjacent each end thereof. Aligned with the threaded apertures 41 are threaded apertures or holes 42 in the front surfaces 39 of the calk recesses 37 and 38. The aligned, threaded apertures 41 and 42 are adapted to register with the threaded holes 27 in the calk members 24 and 25 when the upper shoe member 11 is securely latched by the tongue 34 and latch recess 20 and the lower surface 17 of the upper shoe member 11 is flush with the top surface 30 of the body member 12. Thus, the rear portions of the body member 12 and upper shoe member 11 are held in fixed position by threaded bolts, such as 43 threaded through the aligned apertures 41, 27 and 42.

Figure 4:
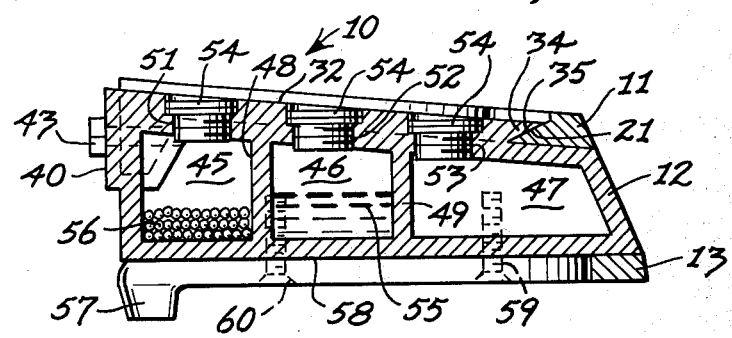
FIG. 4 is a section taken along the line 4—4 of FIG. 3.
Figure 1:
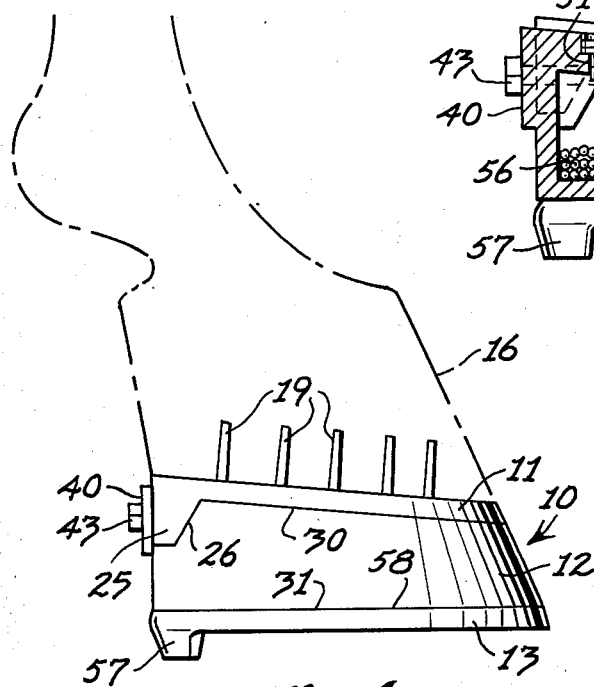
FIG. 1 is a side elevation of the horseshoe assembly mounted upon the hoof of a horse.
Figure 2:
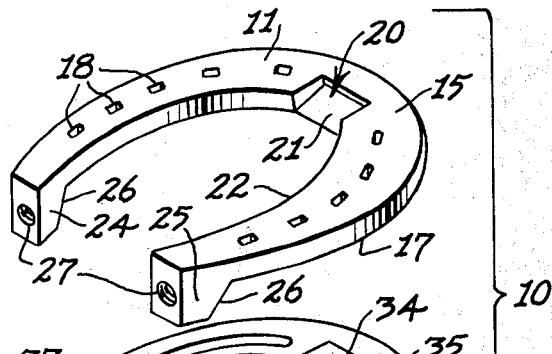
FIG. 2 is a slightly enlarged, exploded, perspective view of the horseshoe, with the body member separated from the upper shoe member.
Figure 5:
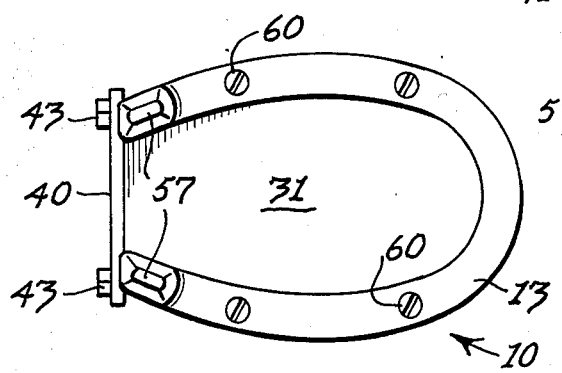
FIG. 5 is a bottom plan view of the horseshoe assembly.

The interior of the body member 12 is hollow and provided with at least two cavities, such as the three cavities 45, 46 and 47 disclosed in FIG. 4, separated by the transverse partition walls 48 and 49. Each cavity 45, 46 and 47 is provided with an inlet port 51, 52 and 53, respectively, normally closed by a closure member or plug 54. The inlet ports 51-53 extend through the boss 32 in the top of the body member 12 for communication with the respective cavities 45-47. By removing one or more of any desired plug or plugs 54, fluent weight material, such as mercury 55 may be introduced into any of the cavities, such as disclosed in cavity 46. Other types of fluent weight material, such as metal shot 56 may be poured into any of the cavities, such as is disclosed in cavity 45. The amount of the fluent weight material may be varied from cavity to cavity in order to provide the proper weight distribution from front to rear within the body member 12.

The lower shoe member 13 is also C-shaped generally in the same configuration as a conventional horseshoe. The rear portion of the lower shoe member 13 is provided with depending calks 57. The lower shoe member 13 is also provided with a flat top surface 58 for fitting flush against the bottom surface 31 of the body member. Threaded holes 59 are formed through the lower shoe member 13 for receiving threaded bolts 60 which project up into mating threaded holes, not shown, in the side walls of the body member 12.

In the operation of the horseshoe 10, preferably the upper shoe member 11 is first secured to the bottom of the horse's hoof 16 by the horseshoe nails 19. Moreover, the lower shoe member 13 is secured by the bolts 60 to the body member 12. The threaded plugs 54 are removed and the proper amount of weight material, such as mercury 55 or shot 56, is poured into one or more of the desired cavities 45, 46 and 47 until the proper weight distribution is attained. The plugs 54 are then secured to close the inlet ports 51, 52 and 53. The front portion of the body member 12 is then raised to cause the tongue 34 to first move toward and register with the latch recess 20. The tongue surface 35 is slid along the bottom surface 21 of the latch recess 20 until the top surface 30 of the body member 12 rests flush against the bottom surface 17 of the upper shoe member 11. During the forward sliding motion of the body member 12 relative to the upper shoe member 11, the calk members 24 and 25 are sliding along the top surface 30 until they drop into their corresponding calk recesses 37 and 38. The size and spacing of the latch recess 20, tongue 34, calk members 24 and 25 and calk recesses 37 and 38 are such that when the tongue 34 is completely received within the latch recess 20, the depending calk members 24 and 25 are also received flush within their corresponding recesses 37 and 38, respectively. Also, the boss 32 is received within the central opening 22, so that there is complete stability laterally and longitudinally when the upper shoe member 11 is properly fitted and assembled upon the body member 12. To hold the upper shoe member 11 and body member 12 in their assembled poitions, the bolts 43 are threaded through the corresponding aligned apertures 41, 27 and 42.

When it is desired to remove the body member 12 from the upper shoe member 11, the bolts 43 are quickly unthreaded and removed from the respective apertures 41, 27 and 42. The rear portion of the body member 12 is then dropped and simultaneously moved rearward to remove the calk members 24 and 25 from their respective recesses 37 and 38 and the tongue member 34 from the latch recess 20. The assembled body member 12 and lower shoe member 12 may remain in assembled position by the bolts 60 for storage until further use. Moreover, the weight material 55 and 56 may remain the same unless it is desired to change the distribution of the weight within the horseshoe assembly 10. The upper shoe member 11 preferably remains on the horse's hoof 16 until further use of the body member 12 is required. The upper shoe member 11 functions as a conventional horseshoe when the body member 12 is removed, being of the same shape as a conventional horseshoe and having its own calk members 24 and 25.

What is claimed is:
1. A horseshoe comprising:
  a. a C-shaped upper shoe member resembling the shape of a conventional horseshoe, having top and bottom surfaces, a front portion, a large central opening, and separate rear portions forming depending calk members,
  b. means for securing said upper shoe member to the bottom of a horse's hoof,
  c. a body member having the shape of a hoof extension and having front and rear portions and top and bottom surfaces,
  d. a boss projecting upward from the top surface of said body member and having a shape similar to the central opening in said upper shoe member for snug reception within said central opening in operative position, said boss projecting rearward between said calk members in operative position,
  e. a first latch element on the front portion of said upper shoe member,
  f. a second latch element on the front portion of said body member to latch the top surface of said body member flush against the bottom surface of said upper shoe member in operative position,
  g. separate recesses formed in the rear portion of the top surface of said body member on opposite sides of said boss, each recess receiving a corresponding calk member in operative position,
  h. a T-bar member fixed to the rear end portion of said boss and projecting transversely behind said recesses,
  i. aligned threaded apertures through each depending calk member and its corresponding recess,
  j. a registering aperture in each projecting portion of said T-bar aligned with said corresponding threaded apertures,
  k. a threaded bolt for each calk member for registry with said aligned apertures to secure each of said calk members in its corresponding recess in operative position,
  l. a lower shoe member having the general shape of a conventional horseshoe including a top surface conforming to the bottom surface of said body members, and
  m. means for securing the top surface of said lower shoe member flush against the bottom surface of said body member in operative position.

2. The invention according to claim 1 in which the forward surfaces of said calk members and said calk recesses are chamfered to incline forward.

3. The invention according to claim 1 further comprising at least two cavities within said body member separated by a transversely extending partition wall so that said cavities are spaced apart front-to-rear within said body member, each cavity adapted to receive weight material, an inlet opening into each of said cavities, and a closure member for each of said inlet openings.

4. The invention according to claim 3 further comprising a fluent weight material for reception within at least one of said cavities.

* * * * *